US006891301B1

(12) United States Patent
Hsu

(10) Patent No.: US 6,891,301 B1
(45) Date of Patent: May 10, 2005

(54) SIMPLIFIED HYBRID-SECONDARY UNCLUTTERED MACHINE AND METHOD

(75) Inventor: John S. Hsu, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 2 days.

(21) Appl. No.: 10/706,331

(22) Filed: Nov. 12, 2003

(51) Int. Cl.[7] .............................................. H02K 17/42
(52) U.S. Cl. ..................... 310/171; 310/266; 310/268
(58) Field of Search ..................... 310/68 B, 127–151, 310/105–107, 210, 256, 266, 268, 166, 168, 171

(56) References Cited

U.S. PATENT DOCUMENTS

| | | | | |
|---|---|---|---|---|
| 2,550,571 A | * | 4/1951 | Litman | 310/211 |
| 2,759,116 A | * | 8/1956 | Glass | 310/171 |
| 2,947,933 A | * | 8/1960 | Davis | 322/47 |
| 3,248,584 A | * | 4/1966 | Knauer | 310/171 |
| 4,785,213 A | | 11/1988 | Satake | 310/116 |
| 4,945,296 A | | 7/1990 | Satake | 318/538 |
| 5,907,210 A | * | 5/1999 | Chaix | 310/268 |
| 6,310,417 B1 | | 10/2001 | Hsu | 310/112 |
| 6,791,216 B2 | * | 9/2004 | Kalsi | 310/52 |

OTHER PUBLICATIONS

Perahia, J., "Discussions of Hybrid–Secondary–Uncluttered Induction (HSU–I) Machine", IEEE Transactions On Energy Conversion, vol. 17, No. 1, Mar. 2002, pp. 150–151.
Hsu, John S., "Hybrid–Secondary Uncluttered Induction (HSU–I) Machine", IEEE Transactions On Energy Conversion, vol. 16, No. 2, Jun. 2001, pp. 192–197.

* cited by examiner

Primary Examiner—Dang Le
(74) Attorney, Agent, or Firm—Quarles & Brady LLP

(57) ABSTRACT

An electric machine (40, 40') has a stator (43) and a rotor (46) and a primary air gap (48) has secondary coils (47c, 47d) separated from the rotor (46) by a secondary air gap (49) so as to induce a slip current in the secondary coils (47c, 47d). The rotor (46, 76) has magnetic brushes (A, B, C, D) or wires (80) which couple flux in through the rotor (46) to the secondary coils (47c, 47d) without inducing a current in the rotor (46) and without coupling a stator rotational energy component to the secondary coils (47c, 47d). The machine can be operated as a motor or a generator in multi-phase or single-phase embodiments. A method of providing a slip energy controller is also disclosed.

20 Claims, 8 Drawing Sheets

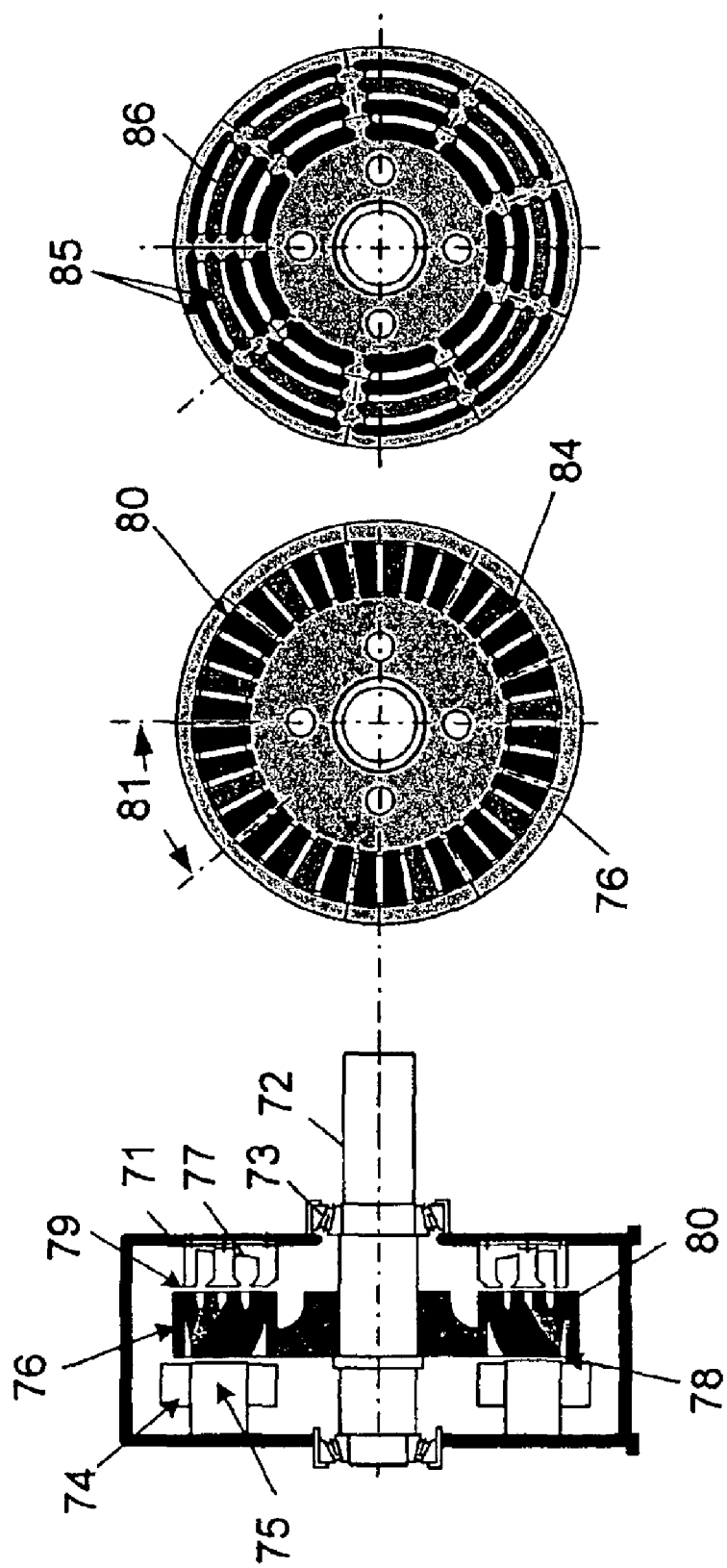

SIMPLIFIED HYBRID-SECONDARY UNCLUTTERED MACHINE AND METHOD

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is brushless machines, including both ac and dc machines, including both motors and generators, and including induction machines, permanent magnet (PM) machines and switched reluctance machines.

DESCRIPTION OF THE BACKGROUND ART

A brushless doubly-fed induction motor (BDFIM) has two sets of stator windings for two p-poles and two q-poles. The rotor winding has a nested cage with 2(p+q) poles. It produces a motor control with a relatively narrow range of speed control. The existing extended rotor cage technology has a drawback in that the both rotational and slip energy are transferred in a cluttered approach to energy transfer.

An induction machine may be viewed as a transformer with its stator as the primary and the rotor as the secondary. A slip-ring wound-rotor induction motor, with a secondary winding is connected through a set of slip rings and brushes, has been known for decades. By changing the resistance connected to the brushes, the starting current and the speed of the motor can be changed. However, maintenance of a motor with slip rings and brushes is expensive.

It is generally agreed that the most significant energy savings for electric motor drives comes from the adjustable speed drive and that the motor plays a relatively less significant role. The high cost of adjustable speed drives fed by an adjustable-frequency inverter discourages many potential users. There are many other known adjustable speed methods. The brushless doubly-fed motor (BDFM) provides an adjustable-speed control having a lower initial cost than other alternatives.

Hsu, U.S. Pat. No. 6,310,417, issued Oct. 30, 2001, disclosed a hybrid-secondary uncluttered induction machine that has a significant potential to lower the cost of adjustable-speed drives. In addition to speed control below synchronous speed, this machine may also be operated above synchronous speed.

The term "hybrid secondary" as it relates to such a machines implies that several secondary circuits can be used in various combinations for different applications. Examples of such secondary circuits are a variable resistance circuit, an inverter circuit for doubly-fed operation, and a generator circuit.

The term "uncluttered coupling" relates to a stator and rotor that couple slip energy. In an induction motor, the speed of the rotating stator field equals the sum of 1) the speed of the rotating rotor field plus 2) the mechanical rotation speed of the rotor. With the motor running at maximum torque and close to synchronous speed, rotor speed is high and slip (the difference between the speed of the rotating stator field and the rotational speed of the rotor) is small, about 3 to 10 percent, and the slip frequency induced in the rotor is small, perhaps two to six cycles per second for a 60 Hz motor.

To couple only slip energy, the stator and rotor have coils that run circumferentially, sometimes referred to as "peripherally," around the axis of rotor rotation. The peripherally wound coils of the rotor and stator are magnetically coupled. The rotor coil rotates and carries a slip-frequency current. Because the rotation does not change the total magnetic flux linking both the rotor and stator coils, no electromotive force (emf) is induced in the stator coil due to the rotation of the rotor coil. This "uncluttered coupling" allows only the slip energy power corresponding to the slip-frequency currents to be transferred between the rotor and stator coils.

It is desired to make such a machine that is more compact and has fewer parts while still providing a source of slip energy for speed control.

SUMMARY OF THE INVENTION

This invention provides a simplified form of the hybrid-secondary uncluttered machine in which there is only a stator and a slip energy rotor. The invention eliminates the main rotor and the auxiliary rotor with windings which were present and electrically connected in the prior art. The stator and slip energy rotor are now magnetically coupled and a slip energy source is provided by peripheral transformer coils in which slip current is induced through the magnetic coupling through a rotor without windings.

The invention is incorporated in an electric machine, comprising a stator having coils for receiving ac electrical power to provide a magnetic field; a rotor disposed within the magnetic field of the stator and spaced from the stator to define a first air gap relative to an axis of rotation for the rotor; at least one stationary core and secondary coil spaced from the rotor by a second air gap; wherein the rotor is provided with a plurality of magnetic elements for coupling flux induced by the magnetic field of the stator to the secondary coil, and wherein the secondary coil is disposed around an axis of rotation for the rotor to allow induction of a slip energy current in the coil without inducing a rotational energy current.

In the new approach, the air-gap rotating flux in the stator that would pass through a machine rotor and a transformer rotor of the prior art is directly transformed to a flux induced in a peripheral transformer stator, which excludes the rotation-frequency flux component. The new approach does not require a rotor winding to produce the slip-frequency currents that are subsequently fed to the two toroidal coils of a peripheral transformer. Unlike the rotor of earlier uncluttered machines, the uncluttered rotor of the present invention does not have a rotor winding. The function of the new rotor is to directly transform the rotating air-gap flux originated by the stator to the uncluttered flux seen by the stationary secondary toroidal cores.

This invention further simplifies and improves the earlier machine. It eliminates two large rotating cores and their windings from the earlier machine. It provides higher efficiency due to less copper loss resulting from the elimination of the rotor windings. It can operate at any speed that including synchronous speed. It is smaller in size per unit of power than prior uncluttered machines and can be manufactured at lower cost.

The invention provides stationary auxiliary windings and avoids the use of any rotating windings.

The invention is also practiced in a method of providing a slip energy control in an electrical machine, the method comprising inducing a first flux in a rotor across a first air gap from a stator by conducting a current in a primary winding of the stator; positioning a secondary coil across a second air gap from the rotor; and inducing a slip current in the secondary coil by magnetically coupling flux through the rotor without inducing a current in the rotor.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

BRIEF DESCRIPTION OF THE DRAWINGS

FIGS. 11a–11c are a sectional view and front and back sviews of another embodiment of a rotor for a motor of the present invention.

DETAILED DESCRIPTION OF THE PREFERRED EMBODIMENTS

Figure 1:
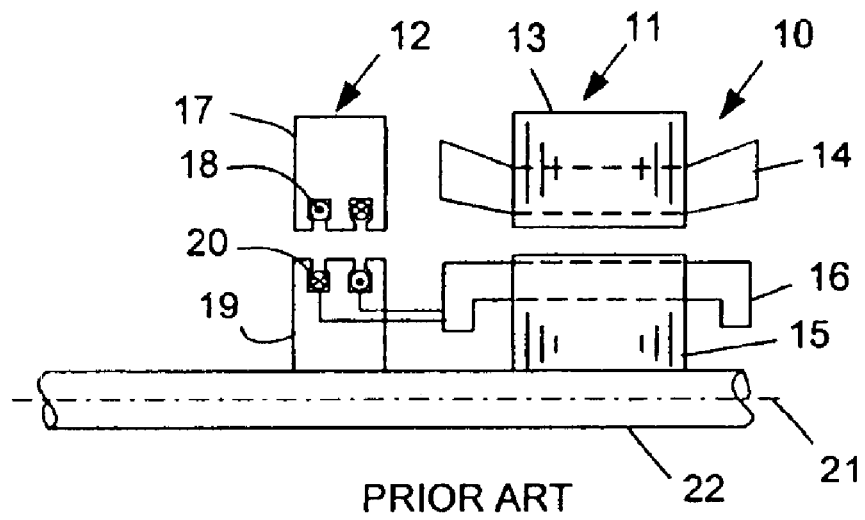
FIG. 1 is a schematic view of a hybrid-secondary uncluttered machine of the prior art.

FIG. 1 illustrates an assembly 10 of an induction motor 11 of the prior art that includes an uncluttered transformer 12 for providing a hybrid secondary. A stator core 13 of the motor 11 is wound with a polyphase winding 14. A rotor core 15 of the motor is wound with a two-phase winding 16. One or more conductors of cast aluminum can also be used on the rotor 15. To the left is a two-phase uncluttered rotating transformer 12. The stator 17 and stator coils 18 of this transformer do not connect to the stator winding 14 of the motor or to the rotor 19 of the transformer 12, but instead are magnetically coupled to the rotor of the transformer. The stator and the rotor of the transformer have coils that are peripherally disposed around the axis of rotation for the motor and the transformer. The electrical connection of the machine rotor to the transformer rotor allows only the slip energy to be present in the rotor of the transformer, and this slip energy is coupled to the stator of the transformer, which has windings for supplying this energy to another device.

Figure 2:
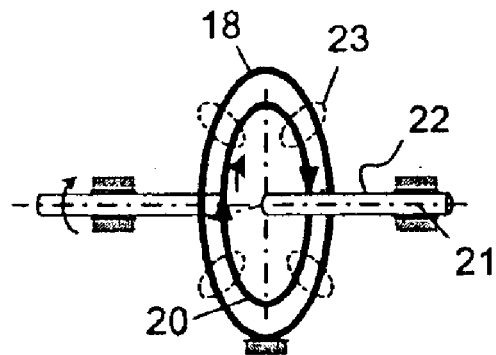
FIG. 2 is a schematic view illustrating the operation of the machine of FIG. 1.

FIG. 2 shows a schematic of the peripherally wound stator coil 18 and the peripherally wound rotor coil 20 that carries a slip energy current. Magnetic flux 23 magnetically couples the stator coil 1B and the rotor coil 20. The rotor 19 rotates with the motor shaft 22 but the stator 17 is stationary. The rotation of the rotor 19 does not induce any additional energy beyond the slip energy in the rotor 19, so only the slip energy is coupled to the stator coil 17 of the transformer 12 in FIG. 1.

Figure 4:
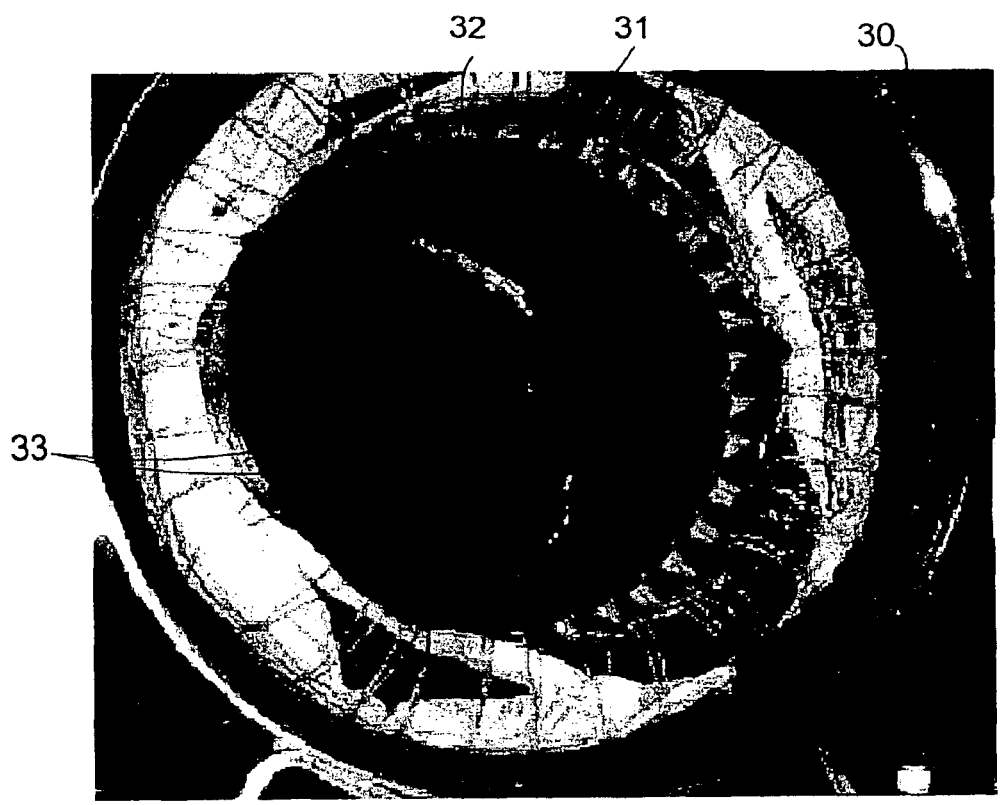
FIG. 4 is a perspective view of an inside of a dual stator in a hybrid-secondary uncluttered machine of the prior art.
Figure 5:
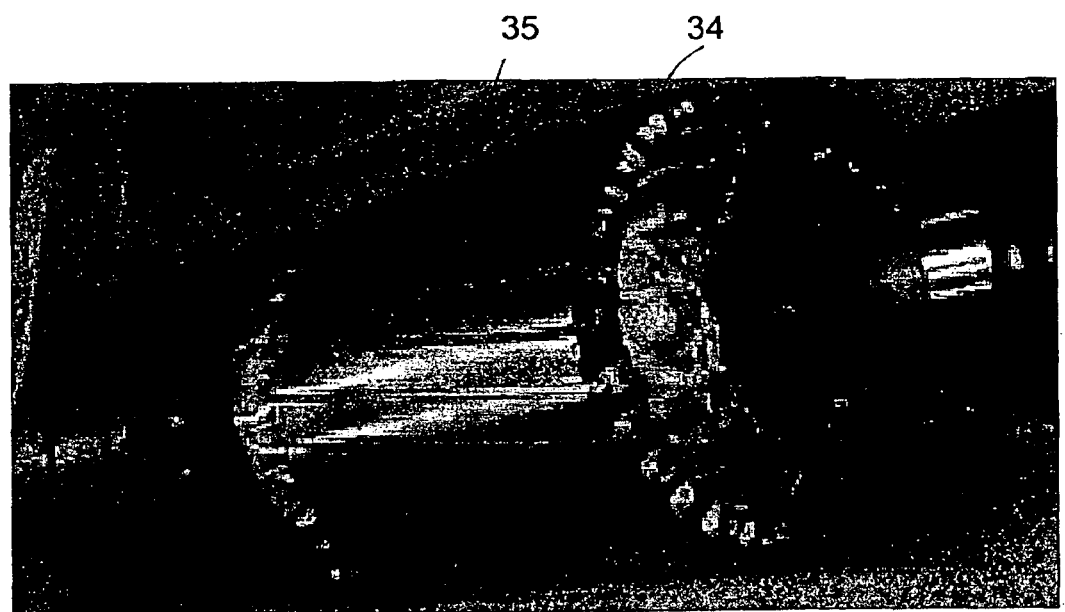
FIG. 5 is a perspective view of an inside of a dual rotor in hybrid-secondary uncluttered machine of the prior art.

FIGS. 4 and 5 show a physical example of the peripherally disposed coils. FIG. 4 shows a machine housing 30 with the rotor removed to expose the motor stator 31 and the transformer stator 32. The transformer stator 32 exhibits the peripherally disposed coils 33 in FIG. 4. FIG. 5 shows the induction motor rotor 34 with rotor teeth 35 and the transformer rotor 36 with peripherally disposed coils 37.

Figure 3:
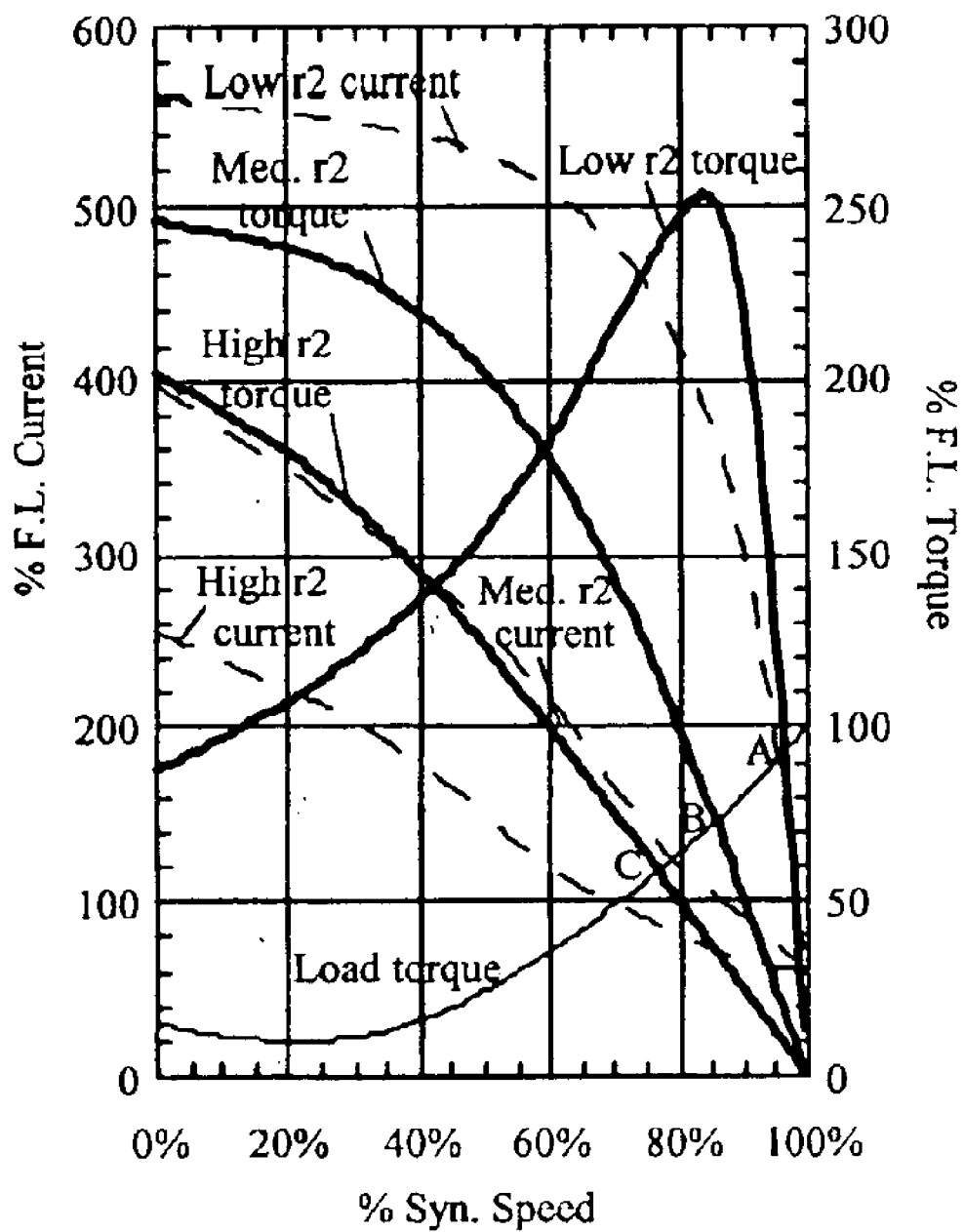
FIG. 3 is a multi-graph of current and torque for high and low resistance for pump and fan loads.

The present invention is advantageous for the control of fan and pump loads, and is also applicable to electric vehicles and hybrid vehicles. Fan and pump loads represent two thirds of the motor drives in industry. The required adjustable speed range and the load torque versus speed curve as showed in FIG. 3, dictate the rating of the slip power controller of an induction motor.

For a fan load without or with a backpressure, the required fan power may be proportional to the cube or to the square of speed, respectively. Assuming unity efficiency and power factor, the per-unit slip power for these two examples may be roughly estimated as.

$$(\text{per unit slip power}) \approx \text{slip} \cdot (1-\text{slip})^{3 \text{ or } 2} \tag{1}$$

TABLE 1

Example of per-unit slip powers of fan loads

| Based on stator | Per unit slip power | |
|---|---|---|
| rotating field slip | W/o back pressure $\text{slip}(1-\text{slip})^3$ | With back pressure $\text{slip}(1-\text{slip})^2$ |
| −0.2 | −0.346 | −0.288 |
| −0.1 | −0.133 | −0.121 |
| 0 | 0 | 0 |
| 0.01 | 0.0097 | 0.0098 |
| 0.1 | 0.0729 | 0.081 |
| 0.3 | 0.1029 | 0.147 |
| 0.5 | 0.0625 | 0.125 |
| 0.7 | 0.0189 | 0.063 |
| 0.9 | 0.0009 | 0.009 |
| 1.0 | 0 | 0 |

Table 1 shows that the rating of the positive slip power of a fan load is generally low for speeds below synchronism. Subsequently, even with consideration of the non-unity of power factor and efficiency, the required rating of the control for speed adjustment is low. This enables the use of a very small power electronics module or small adjustable resistors to control a motor with a high power rating. These energy absorption approaches can be characterized as an effective resistance approach.

In order to control the rotor slip energy of an induction motor that has no slip rings, the rotor current must be coupled to a stationary control circuit through a rotating transformer of the type illustrated in FIG. 1.

Figure 6:
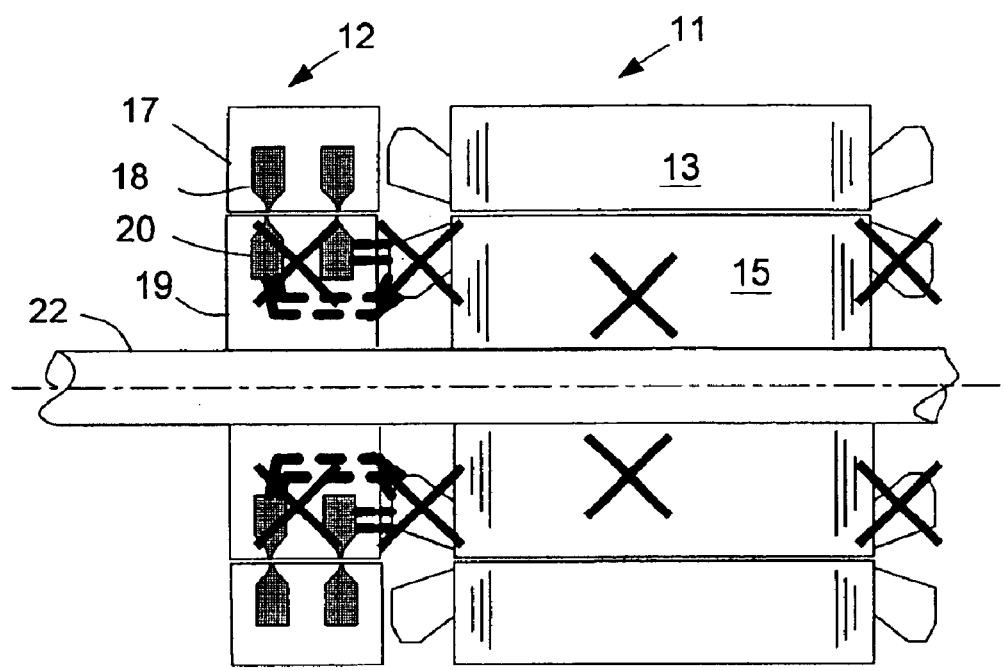
FIG. 6 is an electrical schematic view of a hybrid-secondary uncluttered machine of the prior art showing the parts that are made unnecessary by the present invention.

FIG. 6 schematically illustrates a difference between the present invention and the uncluttered machine of the prior art. In this machine, the rotor 15 of the induction machine 11 and the rotor 19 of the transformer 12 and their electrical interconnection are omitted as represented by the "X's" and a single rotor 46 for magnetically coupling energy between the machine stator and the stator coils of the transformer is added as seen in FIG. 7.

Figure 7:
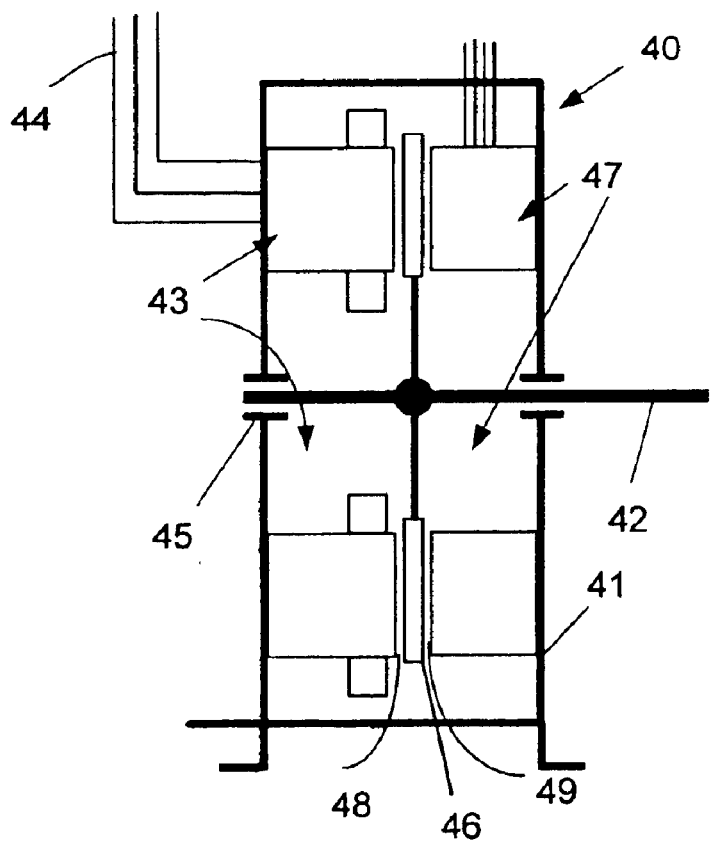
FIG. 7 is a side view in elevation of a two-phase hybrid-secondary uncluttered machine of the present invention.

FIG. 7 shows an example of an axial gap embodiment of the present invention. The entire machine 40 includes a housing 41, a shaft 42 mounted on bearings 45 for rotation in the housing 41, and a toroidal armature (stator) 43 which receives multi-phase power through power lines 44 indicated in FIG. 7. A rotor 46 is positioned between the stator 43 and a toriodal secondary core and coil assembly 47 to provide two axial air gaps 48, 49 relative to the shaft 42. The rotor 46 rotates with the shaft 42 and has non-contact magnetic brushes (not shown in FIG. 7) for conducting flux.

Figure 8C:
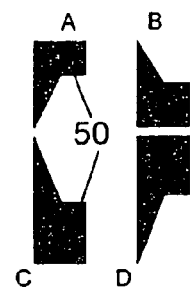
FIG. 8c is a detail view of the magnetic brushes in the rotor of FIGS. 8a and 8b.
Figures 8A, 8B:
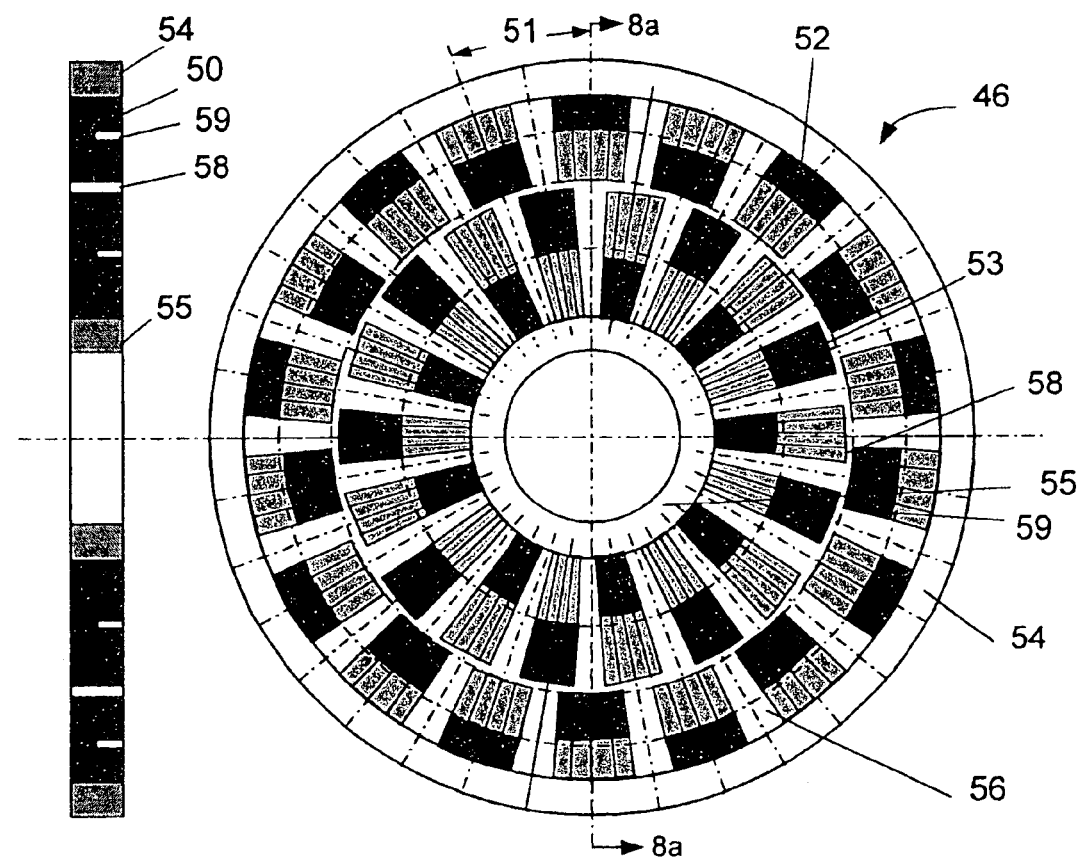
FIG. 8a is a sectional view taken in a plane indicated by line 8a—8a in FIG. 8b.
FIG. 8b is a plan view of a rotor in the two-phase machine seen in FIG. 7.

FIGS. 8a, 8b and 8c show the details of the rotor 46 with magnetic brushes A, B, C and D for a 2-phase, eighteen pole device. Using symbol, n, as the number of phases of the uncluttered rotor, each pole pair area (i.e., two times the pole-pitch 51) of the rotor consists of 2*n (i.e., 4) groups of magnetic brushes A, B, C and D. Two inner groups C, D of these four magnetic-brush groups A, B, C and D form one phase, and two outer groups A, B, form another phase. The detail views of these four groups of magnetic brushes, A, B, C, and D, are shown in FIG. 8c.

The magnetic brushes A, B, C and D can be made of stacked laminations, compressed powder cores, ferromagnetic wires or other equivalent soft magnetic materials that have good magnetic permeability, a high saturation level, and low core-loss properties. The magnetic brushes A, B, C and D are secured between the non-magnetic outer ring 54 and the non-magnetic rotor hub 55. A two-phase flux path for the rotating air-gap flux is formed on one side of the rotor 46 facing the armature 43. On the other side of the rotor 46 are the step-up portions 50 of the magnetic brushes A, B, C and D that form four non-continuous rings. The rings are separated in a radial direction by ring-shaped gaps 58, which are made of material between each pair of magnetic brushes in each phase, each magnetic brush in the pair being separated on the secondary side from its counterpart magnetic brush by a ring-shaped air gap 59. The rings of magnetic brushes are interrupted by radial gaps 56 between the magnetic-brush groups can be filled with non-magnetic materials. Because the summation of the opposite-polarity fluxes passing through the magnetic brushes per pole pair is zero, the boundary space of every pole pair can be made of electrically-conducting non-magnetic materials. This allows the rotor to have sufficiently high mechanical strength required by certain designs. The outer ring 54 should be designed to withstand the centrifugal force of the rotor.

Figure 9:
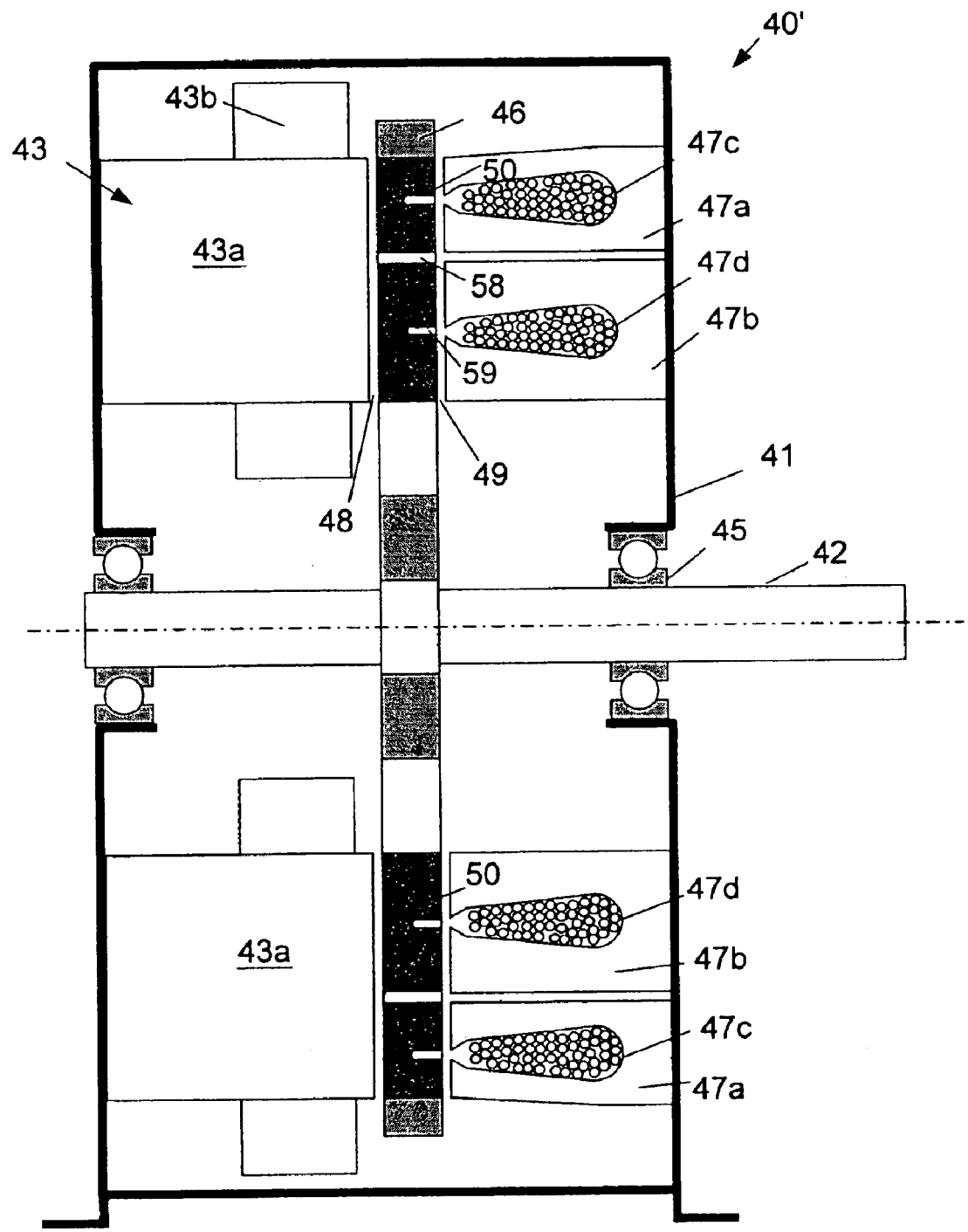
FIG. 9 is a sectional view in elevation of a hybrid-secondary uncluttered machine of the present invention.

FIG. 9 shows a machine 40' which is a variation of the machine 40 of FIG. 7. The stator 43 more particularly includes a stator core 43a and a multi-phase winding 43b having a plurality of turns or coils. Two secondary toroidal cores 47a, 47b and the corresponding peripherally disposed coils 47c, 47d are shown for coupling with the four non-continuous rings of magnetic brushes A, B, C and D to link with the uncluttered fluxes that do not contain the rotating-frequency flux component.

Figures 10A, 10B, 10C:
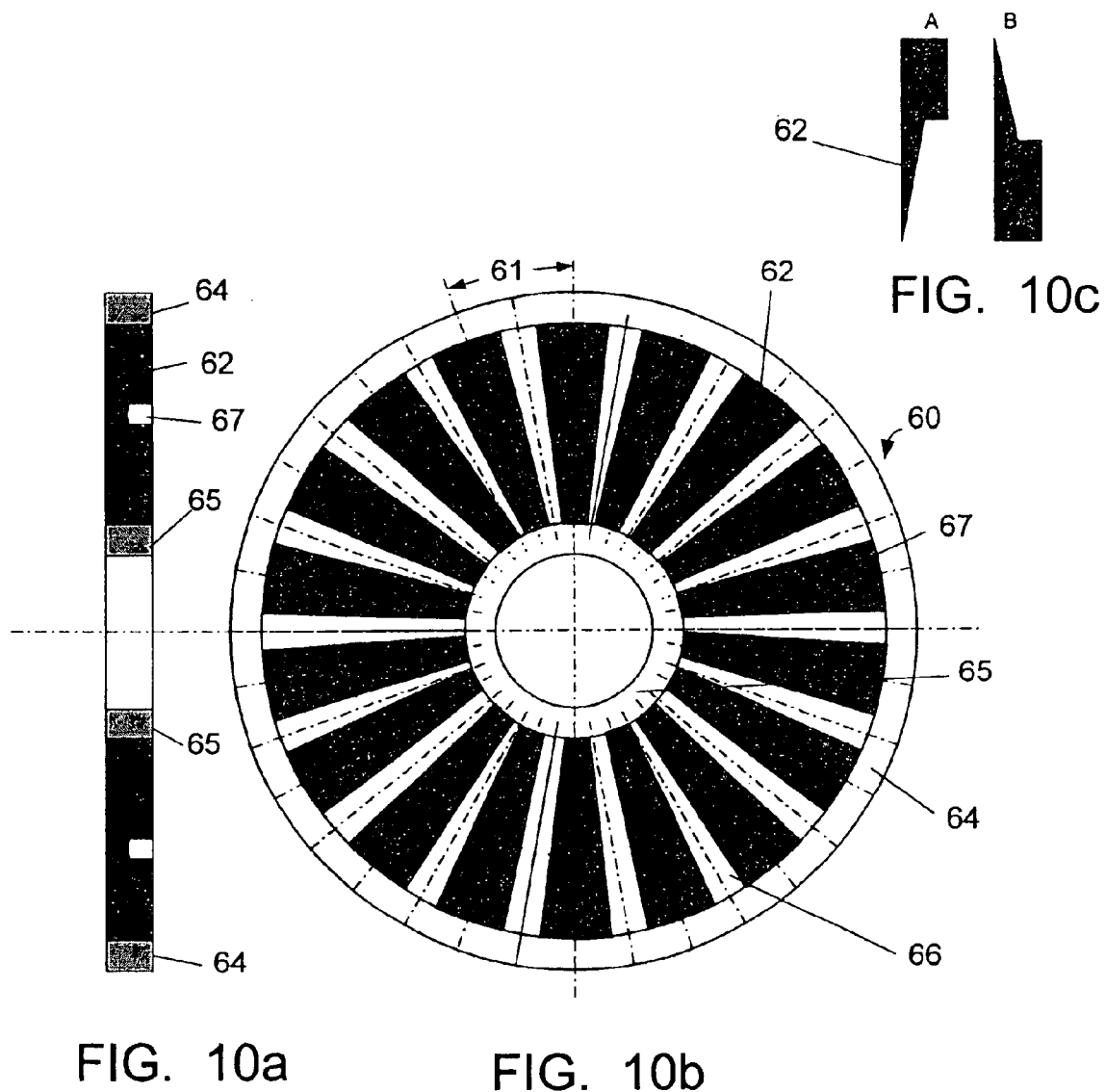
FIGS. 10a and 10b are plan and sectional views of a rotor in a single-phase machine of the present invention.
FIG. 10c is a detail view of the magnetic brushes in the rotor of FIGS. 10a and 10b.

FIGS. 10a–10c show a single-phase (i.e., n=1) uncluttered rotor 60 that can be used as a generator and a motor but without starting torque at standstill when it is fed by the secondary toroidal coils. The rotor 60 has pole pitch distance 61, just one ring of magnetic brushes 62 (A&B separated by space 67), an outer ring of non-magnetic material 64, an inner hub of non-magnetic material 65 and non-magnetic radial, spaced portions 66 between polepairs forming an 18-pole rotor 60.

FIGS. 11a–11c show an alternative embodiment of an induction motor with the slip coupling feature being provided by twisted ferromagnetic wires 80 in the rotor 76. The motor 70 has a housing 71, a rotor shaft 72 supported by bearings 73, an armature (stator) core 75 and polyphase winding 74. A first axial air gap 78 is formed between the rotor 76 and the stator 74, 75 and a second axial air gap 79 is formed between the rotor 76 and the peripheral, secondary coil assembly 77. The magnetic elements 80 in the rotor extend axially toward the stator 74, 75 but are twisted to connect to arcuate segments 85 seen in FIG. 11c. Non-magnetic material 84 is again used in spaces between the magnetic brushes 80 on the stator-facing side and other portions of non-magnetic material 86 are used in spaces between the arcuate segments 85 in FIG. 11c.

The invention provides a method that simplifies the earlier uncluttered induction machine by transforming the conventional rotating flux in the air gap facing the armature to an uncluttered flux (i.e., without the rotation-frequency flux component) facing the secondary toroidal cores and coils.

Other alternative embodiments can be constructed according to the present invention provided that an n-phase flux path for the rotating air-gap flux is formed on one side of the uncluttered rotor facing the armature. On the other side of the rotor, the 2*n non-continuous rings are formed by the step-up portions of the magnetic brushes. The n-phase secondary toroidal cores 47a, 47b and coils 47c, 47d are coupled with the non-continuous rings for linking with the uncluttered fluxes that do not contain the rotation-frequency flux component.

The n-phase secondary toroidal coils 47c, 47d can be connected to different components such as the variable resistors or an inverter for speed control in a motor mode, or to the electric loads in a generator mode.

When the uncluttered rotor is constructed in a single-phase (i.e., n=1), the machine can be used as a generator and motor but without starting torque at standstill. The machine would produce starting torque when the uncluttered rotor is constructed for two or a higher number of phases.

The invention can be used in both axial-gap and radial gap machines.

The uncluttered machine of the prior art cannot operate at synchronous speed because there is no induced current in the rotor at synchronous speed. The machine of the present invention can operate at synchronous speed, because a flux that includes a dc flux can be passed through the rotor at synchronous speed.

Suitable magnetic brushes can be made of materials with good permeability, high magnetic saturation level, and low core loss. Stacks of thin laminations of flux conducting materials, bundles of ferromagnetic wires (see FIG. 11a), or low ac loss compressed powders are material examples for the magnetic brushes and for the secondary toroidal cores.

There are many suitable ways to construct the uncluttered rotor as well as the toroidal cores and coils according to the present invention. The mechanical strength, high saturation level, good permeability, and low core loss are the basic design consideration. A metal rotor frame can be used where inside each small window frame contains one pole-pair of magnetic brushes.

A radial-gap, high strength undiffused machine can also be provided using a secondary coil assembly at the end of a rotor in a radial gap machine. The rotor would then be provided with magnetic brushes in a suitable pattern in place of the familiar conduction bars of an induction motor. For an example of the general machine configuration and a detailed description, reference is made to Hsu, U.S. patent application Ser. No. 10/668,586, filed Sep. 23, 2003.

This has been a description of the preferred embodiments of the invention. The present invention is intended to encompass additional embodiments including modifications to the details described above which would nevertheless come within the scope of the following claims.

I claim:

1. An electric induction machine, comprising:
    a stator having coils for receiving ac electrical power to provide a magnetic field;
    a rotor disposed within the magnetic field of the stator and spaced from the stator to define a first air gap relative to an axis of rotation for the rotor;
    at least one stationary core and secondary coil spaced from the rotor by a second air gap;
    wherein the rotor is provided with a plurality of magnetic elements for coupling flux, which is induced by the magnetic field of the stator, to the secondary coil, and
    wherein the secondary coil is disposed around an axis of rotation for the rotor to allow induction of a slip energy current in the coil without inducing a rotational energy current.

2. The machine of claim 1, wherein the first air gap is an axial air gap disposed along the axis of rotation of the rotor, and wherein the second air gap is an axial air gap disposed along the axis of rotation of the rotor.

3. The machine of claim 1, wherein the magnetic elements are provided in pairs for each electrical phase of power supplied to the stator coils.

4. The machine of claim 2, wherein each pair of magnetic elements is spaced apart in a radial direction by a non-magnetic ring on a side of the rotor facing the least one stationary, secondary core and coil.

5. The machine of claim 1, wherein the magnetic elements are magnetic brushes made of stacked metal laminations.

6. The machine of claim 1, wherein the magnetic elements are magnetic brushes made of a compressed powder material having ferromagnetic properties.

7. The machine of claim 1, wherein the magnetic elements are twisted elements with portions projecting toward the stator and with arcuate portions facing the secondary coil.

8. The machine of claim 1 wherein the rotor is made of electrically conducting non-magnetic material in portions which support and separate the magnetic brushes.

9. The machine of claim 1, wherein the machine is an ac induction machine.

10. The machine of claim 1, wherein the machine is a motor.

11. The machine of claim 1, wherein the machine is a generator.

12. The machine of claim 1, wherein there are a plurality of stationary, secondary cores with secondary coils spaced from the rotor by the second air gap and disposed around the axis of rotation for the rotor.

13. The machine of claim 12, wherein the secondary coils are adapted to be connected to supply slip energy to a resistive load.

14. A method of providing slip energy control in an electrical machine, the method comprising:
    inducing a flux in a rotor across a first air gap from a stator by conducting a current in a first winding of the stator;
    positioning a secondary coil across a second air gap from the rotor; and
    inducing a slip current in the secondary coil by magnetically coupling the flux through the rotor without inducing a current in the rotor.

15. The method of claim 14, wherein the first air gap is disposed axially along an axis of rotation for the rotor and wherein the second air gap is also disposed axially along an axis of rotation for the rotor.

16. The method of claim 14, wherein the machine is operated as an ac induction machine.

17. The method of claim 14, wherein the machine is operated as a motor.

18. The method of claim 14, wherein the machine is operated as a generator.

19. The method of claim 14, wherein a dc excitation is provided to the secondary coil for operating the machine at synchronous speed.

20. The method of claim 14, wherein a dc excitation is provided to the secondary coil for operating the machine as a brushless dc machine.

* * * * *

UNITED STATES PATENT AND TRADEMARK OFFICE
CERTIFICATE OF CORRECTION

PATENT NO. : 6,891,301 B1
DATED : May 10, 2005
INVENTOR(S) : John S. Hsu

It is certified that error appears in the above-identified patent and that said Letters Patent is hereby corrected as shown below:

Column 4,
Line 4, "1B" should be -- 18 --.

Signed and Sealed this

Twenty-seventh Day of September, 2005

JON W. DUDAS
*Director of the United States Patent and Trademark Office*